UNITED STATES PATENT OFFICE.

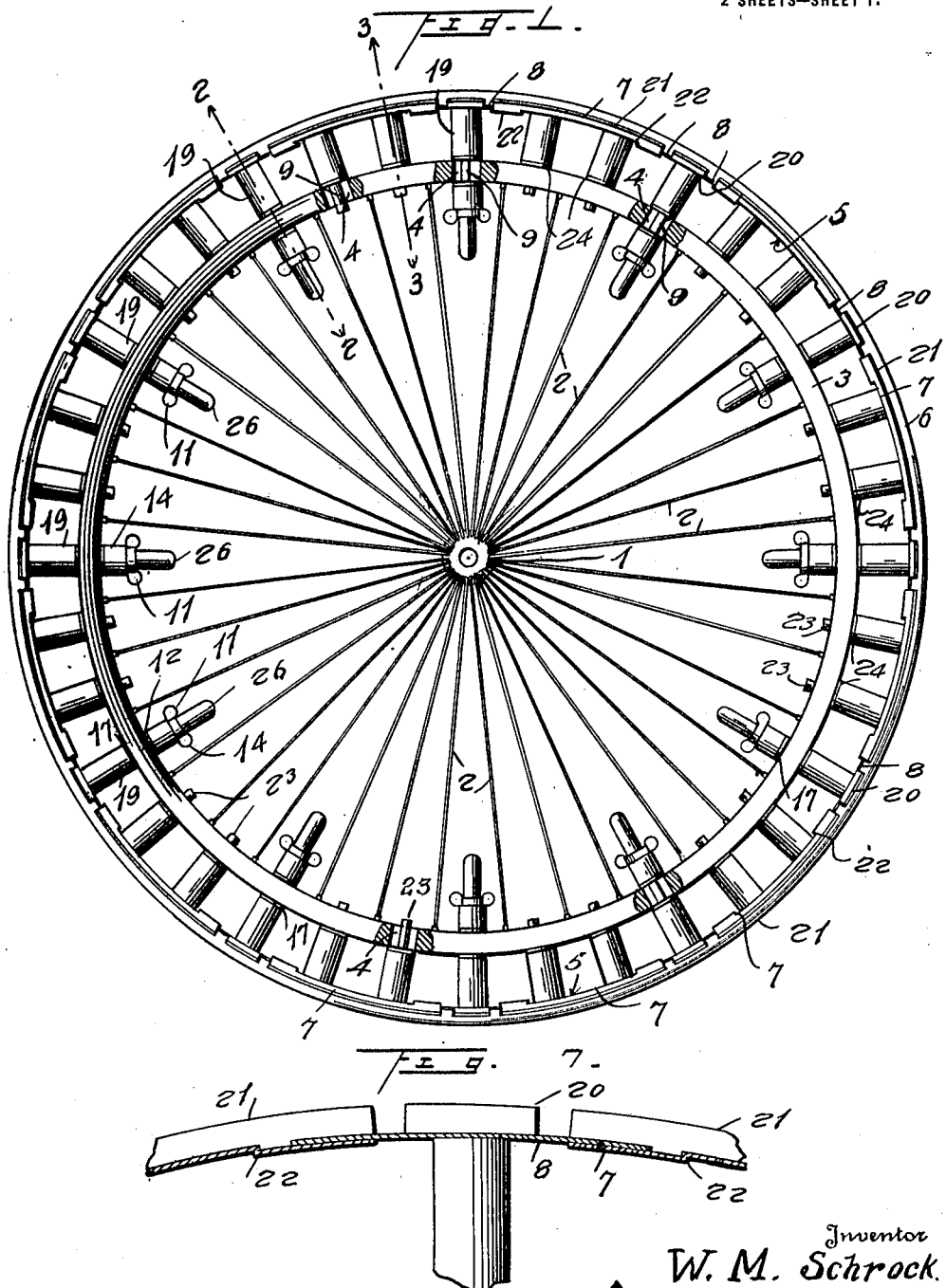

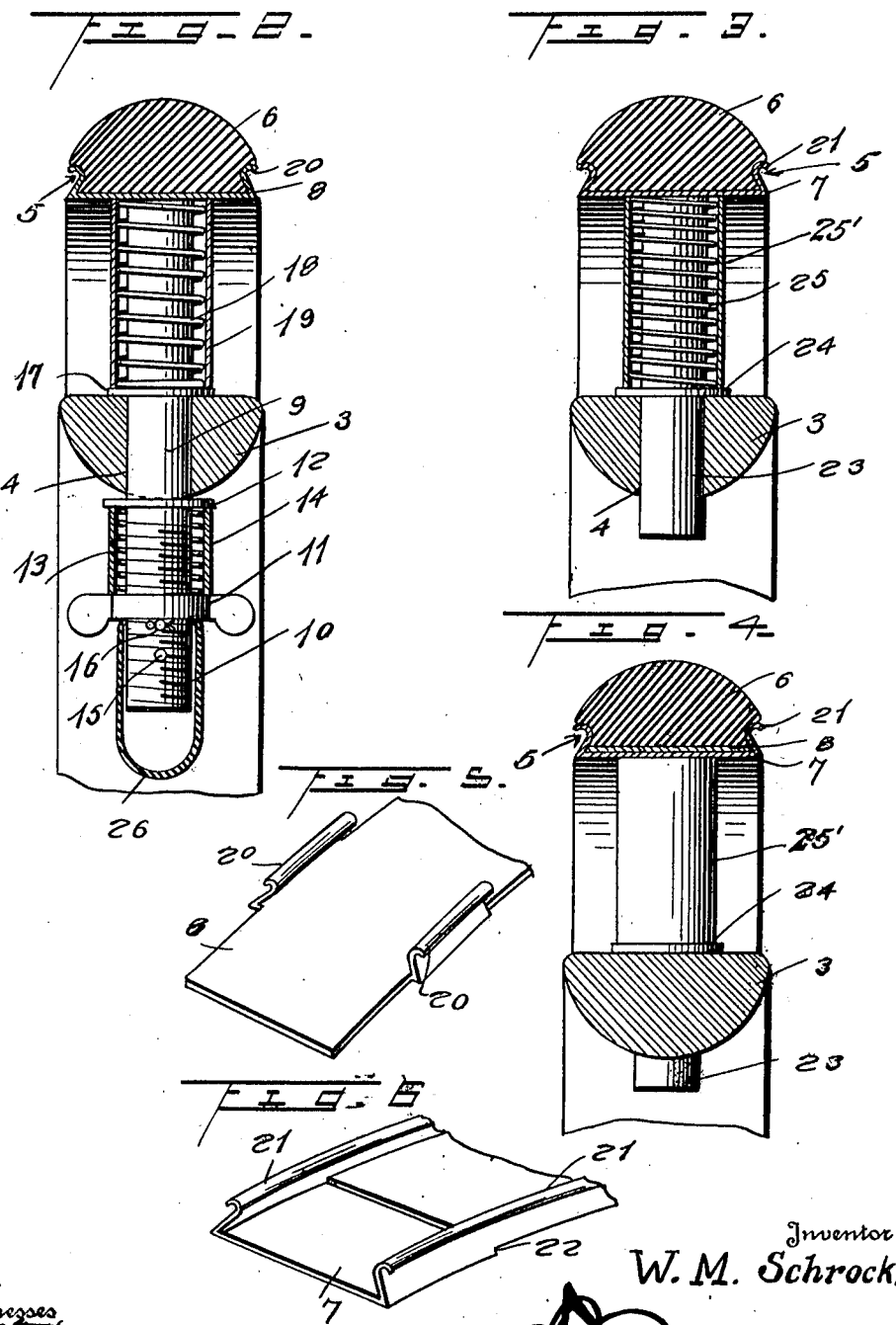

WALLACE M. SCHROCK, OF JEANNETTE, PENNSYLVANIA.

SPRING-WHEEL.

1,314,540.  Specification of Letters Patent.  Patented Sept. 2, 1919.

Application filed April 6, 1918. Serial No. 227,063.

*To all whom it may concern:*

Be it known that I, WALLACE M. SCHROCK, a citizen of the United States, residing at Jeannette, in the county of Westmoreland and State of Pennsylvania, have invented certain new and useful Improvements in Spring-Wheels; and I do hereby declare the following to be a full, clear, and exact description of the invention, such as will enable others skilled in the art to which it appertains to make and use the same.

This invention relates to improvements in spring wheels especially adaptable for motorcycles, bicycles, and vehicles, and has for one of its objects the provision of a device of this character, whereby solid tires may be employed with substantially the same result obtainable from pneumatic tires, thereby obviating the expense of repairs for punctures and blow-outs that are frequent to pneumatic tires.

Another object of this invention is the provision of a cushioning means interposed between the inner and outer rims, whereby the outer rim may move in relation to the inner rim to absorb shocks and jars, thereby providing a smooth riding device.

A further object of this invention is the provision of the outer rim constructed of sections, having pins slidable through openings in the inner rim and having expansion springs thereon which are adapted to permit the sections to move inwardly when engaging obstructions, thereby taking up the shocks and jars to the wheel.

A further object of this invention is the provision of means for limiting the outward movement of the sectional outer rim and which will take up the rebound thereto which is caused by shocks and jars.

A still further object of this invention is the provision of a spring wheel of the above stated character, which shall be simple, durable, and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a front elevation partly broken away of a spring wheel constructed in accordance with my invention.

Fig. 2 is a transverse sectional view taken on the line 2—2 of Fig. 1, illustrating the means of absorbing the rebound to the outer rim, Fig. 3 is a similar view taken on the line 3—3 of Fig. 1, Fig. 4 is a fragmentary transverse sectional view illustrating the overlapping ends of the sections of the outer rim, Fig. 5 is a fragmentary perspective view of one of the sections, Fig. 6 is a fragmentary perspective view of another section receiving the end of the section illustrated in Fig. 5, and Fig. 7 is a fragmentary vertical sectional view illustrating the overlapping ends of the sections of the outer rim.

Referring in detail to the drawings, the numeral 1 indicates the hub of a wheel having the usual radial spokes 2 and in this instance I have elected to illustrate spokes in the nature of wire or steel, but may be of wood or other material which is frequent in wheel construction. Secured to the outer end of the spokes 2 is any well known manner is an inner rim 3, provided with spaced openings 4, which openings are of elongated formation circumferentially of the rim 3 and transversely are of substantially the size of pins 9 which will be hereinafter more fully described. An outer rim 5 has mounted thereon a solid tire 6 constructed of rubber or any other material suitable for the purpose. The outer rim 5 is spaced from the inner rim 3 as illustrated in Fig. 1 and consists of a plurality of sections 7 and 8. The sections 8 are of a shorter length than the sections 7 and each carry a pin or rod 9, the inner ends of which are screw threaded as illustrated at 10 and disposed through some of the openings 4 of the inner rim 3 and have threaded thereon adjusting nuts 11. Washers 12 are positioned upon the inner ends of the pins or bolts 9 against the inner face of the inner rim 3 for engagement with one end of coil springs 13 that are mounted upon the inner ends of the bolts or pins 9 and have their other ends seated against the adjusting nuts 11. Suitable protectors of cylindrical formation are constructed of rubber or other material as illustrated at 14 and are positioned between the washers 12 and the adjusting nuts 11 for protecting the springs 13. The inner ends of the bolts or pins 9 are provided with spaced openings for the purpose of receiving locking pins 16 to hold the adjusting nuts 11 against accidental movement or unthreading engagement with the bolts or pins 9 during the use of the device and which openings permit adjustment of the nuts 11.

By having the adjusting nuts 11 adjustably secured to the pins or bolts 9 provides a construction wherein the tension of the springs 13 may be increased and decreased as desired. These springs being especially adaptable for absorbing the rebound to the outer rim 5 upon return to its initial position after being compressed by coming in contact with an obstruction in the roadway. Washers 17 are mounted upon the bolts or pins 9 and rest against the outer face of the inner rim 3 and have seated thereagainst one end of coil springs 18 that are mounted upon the bolts or pins 9 and have their outer ends disposed against the inner faces of the sections 8. Protectors 19 constructed of rubber or any other material suitable for the purpose surround the springs 18 for the purpose of protecting them from dirt and other foreign matter. The sections 8 have formed thereon comparatively short tire engaging flanges 20 that are adapted to engage the tire 6 as clearly illustrated in Fig. 2 for securing said tire firmly thereon.

The longer sections 7 have formed thereon tire engaging flanges 21 similar in construction to the flanges 20 but of a considerable length and also extend the full length of the sections 7. The sections 7 are offset as illustrated at 22 at each end thereof to receive the adjoining ends of the sections 8 thereby forming a continuous outer rim 5. The flanges 21 are adapted to engage and secure the tire 6 to the rim 5 similar to that of the flanges 20. The sections 7 each carry a pair of converging pins or bolts 23 that extend through the openings 4 in the inner rim 3 and have mounted thereon washers 24 that engage the outer face of the inner rim 3. Coil springs 25 are mounted upon the pins or bolts 23 between the sections 7 and the washers 24 for cushionly supporting said sections 7 and are inclosed by protectors 25' constructed of rubber or any other material suitable for the purpose. By having the openings 4 in the inner rim 3 of elongated formation and extending circumferentially of the rim permits the pins which converge to move inwardly therethrough when their respective sections are compressed by engagement with an obstruction in the roadway.

In operation, when any section or sections come in engagement with an obstruction of the roadway, the section or sections move inwardly against the tension of their respective springs, thereby absorbing the shocks or jars to the inner rim. Owing to the tension of the springs 25 the respective sections that have been compressed are forced outwardly and the springs 13 act against the springs 25 absorbing the rebound to the outer rim.

A protector 26 constructed of rubber or any other material suitable for the purpose is placed on the inner ends of the bolts or pins 9 to protect the locking pins 16.

From the foregoing description taken in connection with the accompanying drawings, it will be noted that a spring wheel has been provided which consists of a comparatively few parts and which will efficiently operate under all conditions and one that may employ solid tires and obtain the results therefrom which is obtained from pneumatic tires.

While I have shown and described the preferred embodiment of my invention, it will be understood that minor changes in construction, combination, and arrangement of parts may be made without departing from the spirit and scope of the invention as claimed.

What I claim as new is:—

1. A spring wheel including a hub having radial spokes, an inner rim secured to said spokes and having spaced openings, an outer rim surrounding the inner rim in spaced relation thereto and consisting of a plurality of sections, some of said sections being of greater length than the other sections, said longer sections having their ends offset to form pockets to receive the ends of the adjacent shorter sections, pins carried by said sections and slidable through the openings in the inner rim, means carried by the pins of the shorter sections for limiting the outward movement of the outer rim in relation to the inner rim, and cushioning means carried by the pins and interposed between the rims.

2. A spring wheel including a hub having radial spokes, an inner rim secured to said spokes and having spaced openings, an outer rim surrounding the inner rim in spaced relation thereto and consisting of a plurality of sections, some of said sections being of a greater length than the other sections, said longer sections having their ends offset to form pockets to receive the ends of the adjacent shorter sections, pins carried by said sections and slidable through the openings, nuts adjustably secured to the pins of the shorter sections, springs interposed between the nuts and the inner rim, springs mounted on the pins and bearing against the sections and the inner rim, and elastic protectors surrounding the springs.

In testimony whereof I affix my signature in presence of two witnesses.

WALLACE M. SCHROCK.

Witnesses:
  LAIRD F. SHRADER,
  JOSEP P. SCHROCK.

Copies of this patent may be obtained for five cents each, by addressing the "Commissioner of Patents, Washington, D. C."